(12) United States Patent
Kang et al.

(10) Patent No.: US 10,732,429 B2
(45) Date of Patent: Aug. 4, 2020

(54) IMAGE ACQUISITION DEVICE

(71) Applicant: LG ELECTRONICS INC., Seoul (KR)

(72) Inventors: Hyungjoo Kang, Seoul (KR); Kwanhyung Kim, Seoul (KR); Dongryeol Lee, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 16/057,681

(22) Filed: Aug. 7, 2018

(65) Prior Publication Data
US 2019/0285907 A1 Sep. 19, 2019

(30) Foreign Application Priority Data

Mar. 14, 2018 (KR) .................. 10-2018-0029825

(51) Int. Cl.
*G02B 27/64* (2006.01)
*G03B 5/00* (2006.01)
(Continued)

(52) U.S. Cl.
CPC .......... *G02B 27/646* (2013.01); *G01H 1/003* (2013.01); *G02B 13/0065* (2013.01);
(Continued)

(58) Field of Classification Search
CPC .............. G03B 5/00; G03B 2205/0023; G03B 2205/0069; G03B 17/02; G03B 17/17;
(Continued)

(56) References Cited

U.S. PATENT DOCUMENTS 10,516,773 B2 * 12/2019 Yoon .................. G02B 13/0015
2014/0340537 A1 11/2014 Eromaki
(Continued)

FOREIGN PATENT DOCUMENTS

JP 11271833 10/1999
JP 2004219930 8/2004
(Continued)

OTHER PUBLICATIONS

PCT International Application No. PCT/KR2018/007794, Notification of Transmittal of the International Search Report and the Written Opinion of the International Searching Authority, or Declaration dated Dec. 13, 2018, 9 pages.
(Continued)

*Primary Examiner* — Collin X Beatty
(74) *Attorney, Agent, or Firm* — Lee, Hong, Degerman, Kang & Waimey PC (57) ABSTRACT

There is disclosed an image acquisition device comprising a reflection unit configured to reflect a light incident in a first direction toward a second which is perpendicular to the first direction; a lens unit comprising one or more lenses provided behind the reflection unit on an optical passage, the lens unit configured to form the optical passage in the second direction; a refraction unit provided between the lens unit and the reflection unit and varying a refraction direction as one surface is pressed; a pressing unit forming a pressing surface which contacts with one surface of the refraction unit; a first drive unit configured to tilt the pressing surface with respect to a first direction vertical axis; and a driver configured to drive the first drive unit in response to vibration.

11 Claims, 12 Drawing Sheets

(51) Int. Cl.
  *G02B 13/00* (2006.01)
  *H02K 41/035* (2006.01)
  *G01H 1/00* (2006.01)
(52) U.S. Cl.
  CPC ........... *G02B 13/0075* (2013.01); *G03B 5/00* (2013.01); *H02K 41/0356* (2013.01); *G03B 2205/0023* (2013.01); *G03B 2205/0069* (2013.01)
(58) Field of Classification Search
  CPC ............ G03B 2205/0007; G01H 1/003; G02B 13/0065; G02B 13/0075; G02B 27/646; G02B 3/12; G02B 7/08; G02B 7/1828; H02K 41/0356; H04N 5/2252; H04N 5/23287
  USPC ........................................................ 359/555
  See application file for complete search history.

(56) References Cited

U.S. PATENT DOCUMENTS

2016/0274375 A1   9/2016   Park et al.
2018/0067335 A1   3/2018   Chen et al.

FOREIGN PATENT DOCUMENTS

JP   2013205451   10/2013
KR   1020170105236   9/2017

OTHER PUBLICATIONS

Korean Intellectual Property Office Application No. 10-2018-0029825, Office Action dated Jul. 8, 2019, 5 pages.

* cited by examiner

IMAGE ACQUISITION DEVICE

CROSS-REFERENCE TO RELATED APPLICATIONS

Pursuant to 35 U.S.C. § 119(a), this application claims the benefit of earlier filing date and right of priority to Korean Patent Application No. 10-2018-0029825, filed on Mar. 14, 2018, the contents of which are all hereby incorporated by reference herein in its entirety.

BACKGROUND OF THE DISCLOSURE

Field of the Disclosure

Embodiments of the present disclosure relate to an image acquisition device having an image stabilization function configured to optically correct blurriness in image acquisition.

Background of the Disclosure

When taking a photo with an apparatus having an image acquisition device, without using an auxiliary camera pedestal, a user shakes an image acquisition device. Such shaking might end up with blurriness of a desired object or images of objects.

Disadvantages of image degradation which might be caused by such shaking of the image acquisition device, in other words, the shaking of the image acquisition device may be solved by using an image stabilization function which is provided in such the image acquisition device.

The image stabilization function may be categorized into OIS (Optical Image Stabilization) and EIS (Electronic Image Stabilization) based on an image stabilization method.

In such EIS, ISO sensitivity is raised and a photo is taken under a high ISO sensitivity so as to minimize image blurriness. Accordingly, such EIS may be realized without additional mechanical components except components for adjusting ISO sensitivity and increase of expense may be minimized.

However, such EIS raises ISO sensitivity, which might cause other problems, and cannot prevent the shaking of the device so that it cannot be a fundamental solution.

In OIS, some parts of the image acquisition module is moved as the feedback based on a level or direction of the shaking generated in the device so as to bring an effect that the image which reaches an image sensor of the device will not shake even with the shaking of the device or the shaking can be minimized.

In this instance, the image acquisition device using OIS requires a lens which has a sufficient space for actual movement and a sufficient space in which a drive system for moving the lens is provided. The issue of the space might be a problem in case the image acquisition device is invented to satisfy the demands for a slim design.

There are increasing demands for an image acquisition device which is capable of satisfying such the spatial requirement and realizing the sufficient image stabilization function.

SUMMARY OF THE DISCLOSURE

Accordingly, an object of the present invention is to address the above-noted and other problems and provide an image acquisition device which is provided in the small space mentioned as the above-noted problem and configured to perform a sufficient image stabilization function.

Embodiments of the present disclosure may provide an image acquisition device comprising a reflection unit configured to reflect a light incident in a first direction toward a second which is perpendicular to the first direction; a lens unit comprising one or more lenses provided behind the reflection unit on an optical passage, the lens unit configured to form the optical passage in the second direction; a refraction unit provided between the lens unit and the reflection unit and varying a refraction direction as one surface is pressed; a pressing unit forming a pressing surface which contacts with one surface of the refraction unit; a first drive unit configured to tilt the pressing surface with respect to a first direction vertical axis; and a driver configured to drive the first drive unit in response to vibration.

The first drive unit may comprise a coil; a magnet configured to a line of a magnetic force which passes through the coil; and a power supply unit configured to apply an electric current to the coil.

The image acquisition device may further comprise a housing in which the reflection unit is loaded; a hinge hole provided in the housing; and a first hinge hingedly coupled to the hinge hole and configured to guide the tilting of the pressing unit.

The image acquisition device may further comprise a slider provided in each of the sides of the refraction unit in a perpendicular direction with respect to the other surface of the refraction unit; a connection bridge provided to connect one side of each slider to both sides of the pressing unit; and a plate spring configured to connect the other side of each slider to a fixing end.

The first drive unit may comprise a coil fixedly coupled to the fixing end; and a magnet fixedly coupled to the slider and configured to generate a mutual electromagnetic force together with coil, and the driver may drive the sliders to move the coil and the magnet in the reverse directions.

The image acquisition device may further comprise a second drive unit configured to tilt the reflection unit with respect to a horizontal axis in a third direction which is perpendicular to the first direction and the second direction.

The image acquisition device may further comprise a housing in which the reflection unit is loaded, wherein the reflection unit comprises a reflection unit bracket comprising a second hinge with respect to the third direction horizontal axis, and the second drive unit comprises a coil provided in the housing; a magnet provided in the reflection unit and configured to form a line of an electromagnetic force which passes through the coil; and a power supply unit configured to apply an electric current to the coil.

The image acquisition device may further comprise a gyro sensor configured to sense the vibration of the lens unit.

The image acquisition device may further comprise a substrate in which the driver and the gyro sensor are loaded; and a housing in which the reflection unit is loaded, wherein the substrate is provided in an outer surface of the housing in parallel with a reflection surface of the reflection unit.

The lens unit may comprise one or more lenses; and a main scope tube in which the one or more lenses are loaded; and the image acquisition device further comprising an auto-focusing drive unit configured to move the lens unit in parallel with the direction of the optical passage.

The thicknesses of the refraction unit and the pressing unit may 1.3 mm.

Accordingly, the embodiments have a following advantageous effect. According to at least one embodiment of the present disclosure, the image acquisition device may be provided in the small space mentioned as the above-noted problem and capable of performing a sufficient image stabilization function.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. The terminology used in the present disclosure is used only to describe specific embodiments, not intended to limit the present disclosure. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
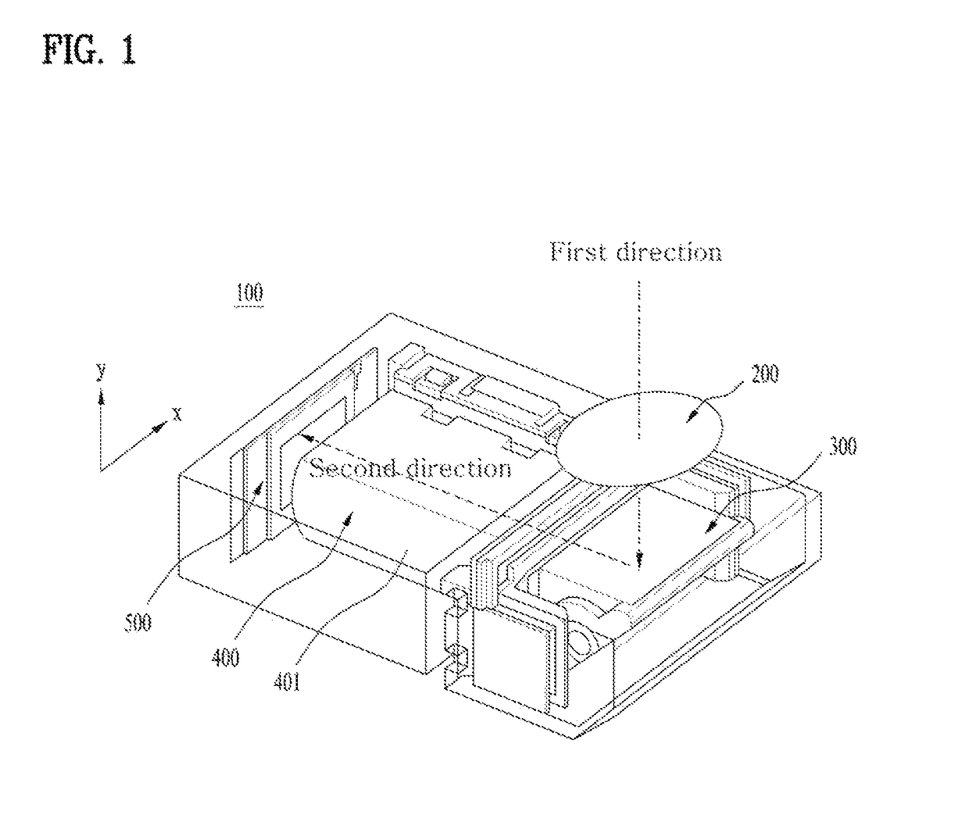
FIG. 1 is a diagram illustrating one example of an image acquisition device in accordance with the present disclosure.

FIG. 1 is a diagram illustrating one example of an image acquisition device 100 in accordance with the present disclosure.

The image acquisition device 100 includes an incident window 200 configured to allow the light emitted or reflected from a subject to be incident thereon; a lens unit 400 configured to refract and penetrate the lights having passed the incident window 200; and an image sensor 500 configured to acquire the image formed by the light of the lens unit 400.

The passage of the light travelling from the subject to the image sensor 500 is defined as an optical passage.

The embodiment of the present disclosure is described based on a Periscope type image acquisition device 100. In the Periscope image acquisition image 100, the direction of the optical passage from a subject to the image sensor 500 is reflected in the reflection unit 300 such as a mirror to be bent.

When the optical passage is bent, the lens unit and the image sensor 500 has no need to be on the same straight line with the incident window 200 and then a design freedom becomes high.

When the direction of the optical passage incident on the incident window 200 is defined as 'a first direction' and the direction of the optical passage which reaches the image sensor 500 via the lens unit 400 is defined as 'a second direction', the reflection unit 300 may reflect the light incident in the first direction toward the second direction.

The reflection unit 300 may reflect the light to make the first direction be perpendicular to the second direction. When the first direction and the second direction are perpendicular to each other, the Periscope type structure may be realized in the image acquisition device 100 having the OIS function mentioned above.

In other words, when the thickness direction is the first direction and the width direction of the image acquisition device 100 is the second direction, the Periscope type structure may facilitate the minimized thickness of the image acquisition device 100.

The perpendicularity of the first and second directions may not be exactly perpendicular and it means that the directions are approximately perpendicular to each other. Especially, the reflection unit 300 is rotated by the image stabilization so that the optical passage may not be always perpendicular.

As mentioned above, the reflection unit 300 is located between the lens unit 400 and the incident window 200 on the optical passage and the lens unit 400 is arranged farther back on the optical passage than the reflection unit 300.

The lens unit 400 may include a plurality of lenses; and a main scope tube 401 for physically fixing the lenses.

Figure 2:
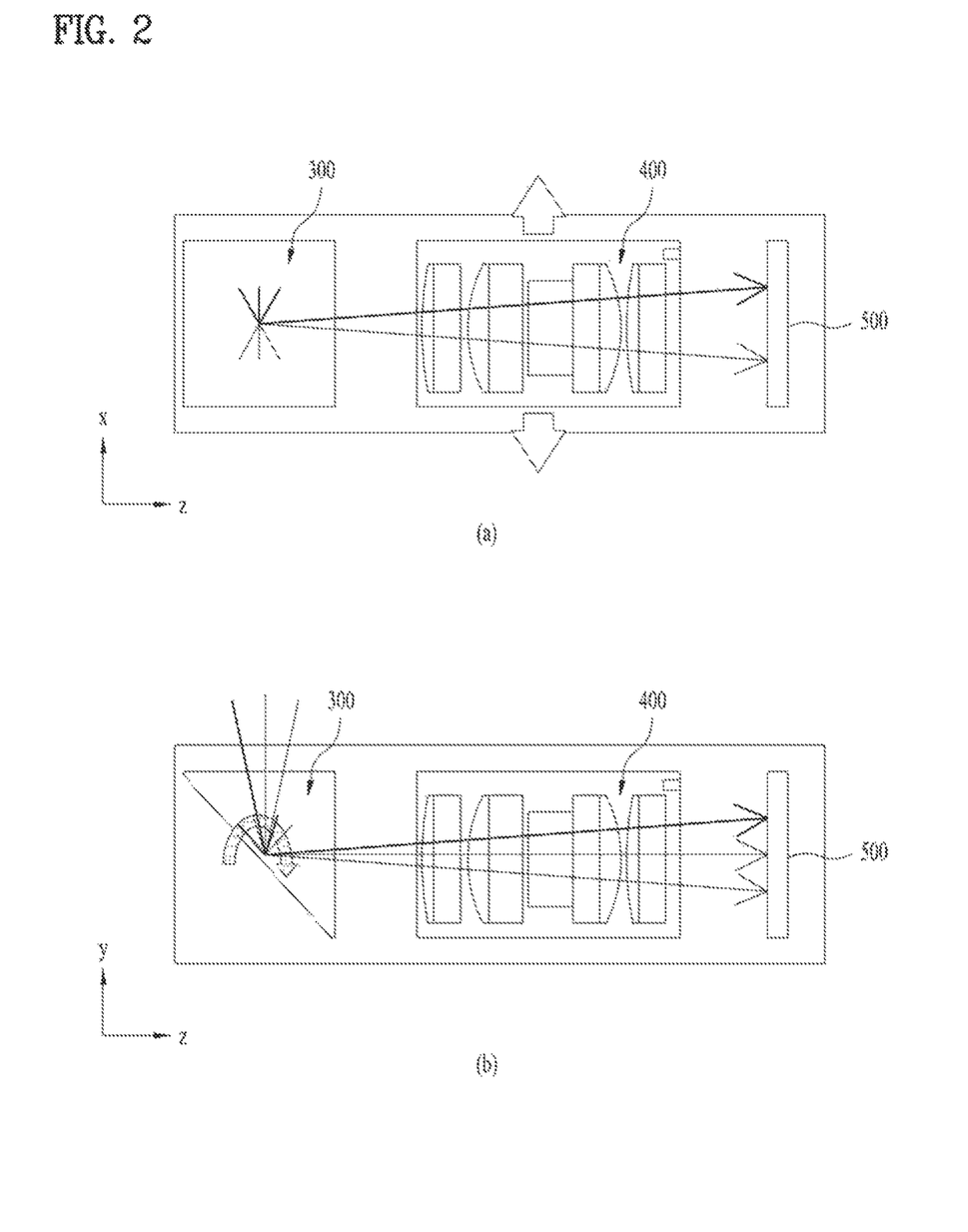
FIG. 2 is a diagram illustrating one example of an image acquisition device configured to implement a conventional optical image stabilization (OIS)
Figure 3:
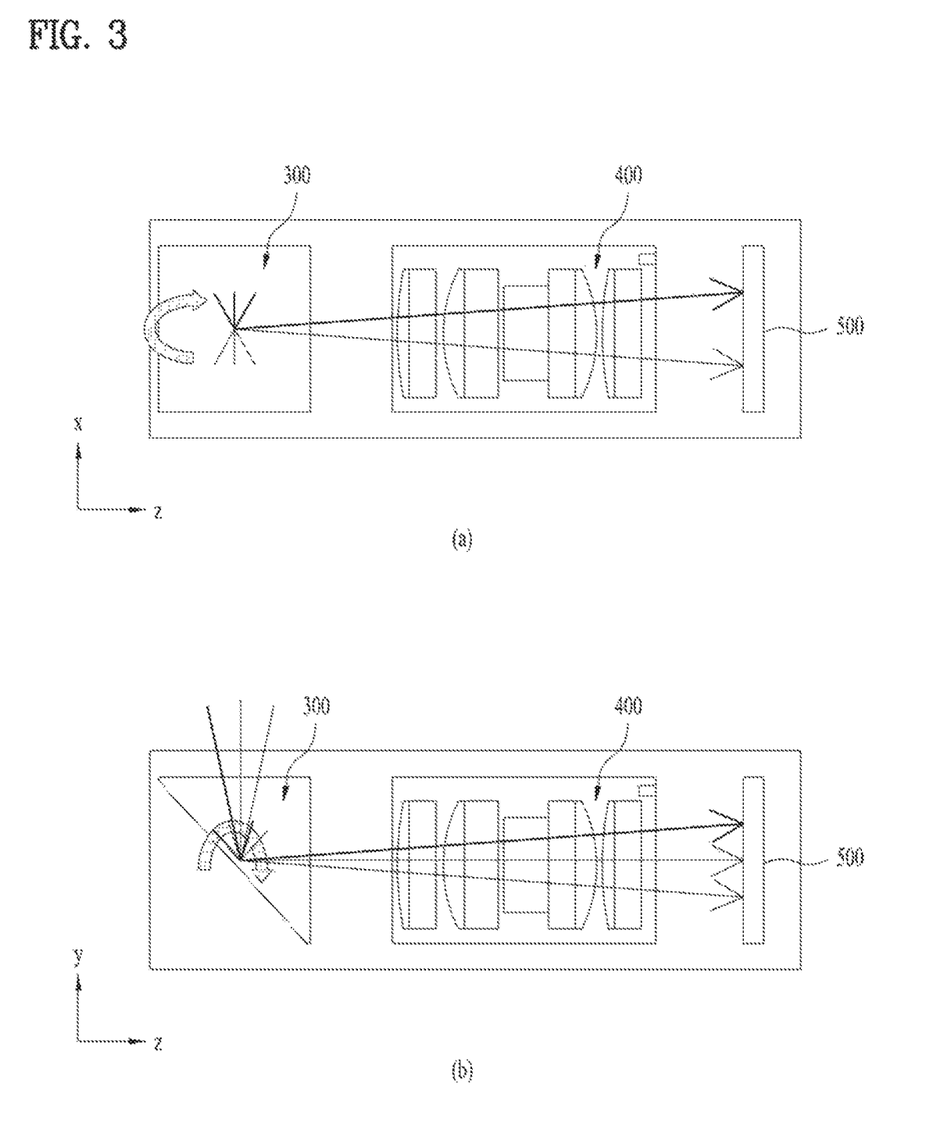
FIG. 3 is a diagram another example of the image acquisition device configured to implement the conventional optical image stabilization (OIS)

FIGS. 2 and 3 illustrate one embodiment and another embodiment of the image acquisition device configured to implement the conventional OIS. For easy description, FIGS. 2 and 3 are referred together.

A driving mechanism for correcting the hand-shaking or vibration of the image acquisition device 100 having the structure shown in FIG. 1 may be realized as the embodiments shown in FIGS. 2 and 3.

When a surface of the image sensor 500 is divided with respect to x-y axes, an x-axis component image stabilization mechanism and y-axis component image stabilization mechanism are required.

Meanwhile, the image stabilization may be realized by the rotational or transitional motion of reflection unit 300 or the lens unit 400. Examples of the rotational motion may include tilting and examples of the transitional motion may include shifting.

As one example shown in FIG. 2, the x-axis component image stabilization is realized by the shift motion of the lens unit 400 as shown in FIG. 2(a) and the y-axis component image stabilization may be realized by the tilting motion of the reflection unit 300 shown in FIG. 2(b).

As another example shown in FIG. 3, both the x-axis component image stabilization and the y-axis component image stabilization may be realized by the rotation of the reflection unit 300. In other words, the reflection unit 300 may include a first structure for the x-axis-component-direction rotation and a second structure for the y-axis-component-direction rotation, so that the reflection unit 300 may implement the both-axes component image stabilization.

The motion of the lens unit 400 or the reflection unit 300 may be driven by a mutual electromagnetism of a magnet and a coil, which is defined as Voice Coil Motor. The mutual electromagnetism of the VC motor is based on Fleming's left hand rule.

Such the mechanism may facilitate the image to move with respect to the x-axis or y-axis direction of the image sensor 500 so as to minimize the image degradation caused by the vibration.

However, such the examples have several disadvantages.

The example of FIG. 2 has to realize the drive systems in the reflection unit 300 and the lens unit 400, respectively, so that it may be difficult to realize the uni-module for the drive systems.

The example of FIG. 3 might have the distortion in a neighboring area which is caused by the combined motions of the two axes, when stabilizing the image by the rotation of the reflection unit 300 with respect to the two axes. In addition, the example of FIG. 3 might have inefficiency of space application. Magnets or coils have to be provided in four surfaces of the reflection unit 300 to rotate the reflection unit 300 with respect to the two axes, so that they may occupy much space near the reflection unit 300 only to increase the overall volume.

Referring to FIG. 1 again, the one-axis component image stabilization is performed by rotating the reflection unit 300 with respect to only one axis and the other-axis component image stabilization is performed by using the refraction unit which has a variable refraction direction, so as to solve the disadvantages of the examples shown in FIG. 2 or 3.

The refraction unit may be provided as some part of the reflection unit 300 or between the reflection unit 300 and the lens unit 400 as an independent component.

Figure 4:
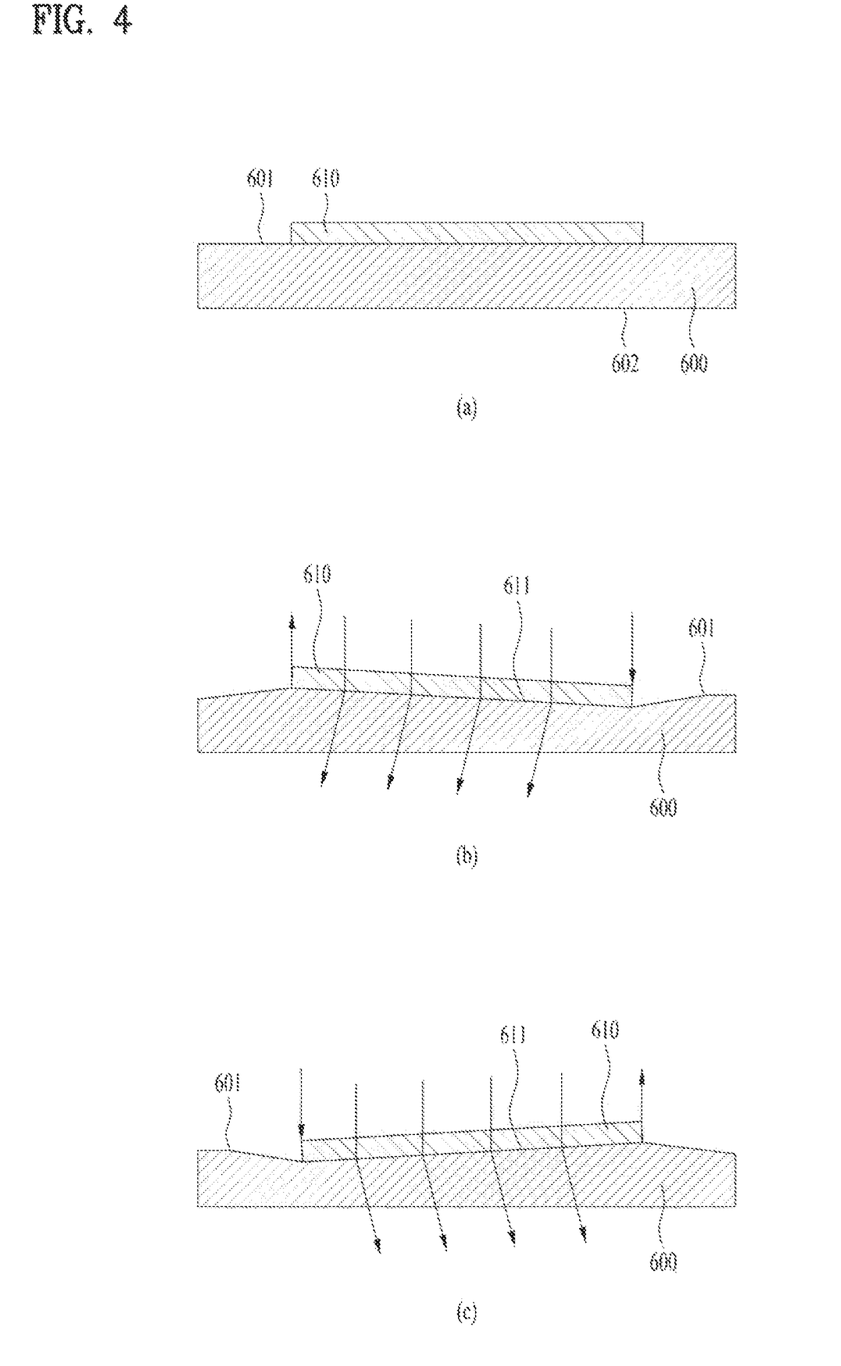
FIG. 4 is a conceptual diagram of a reflection unit and a refraction unit which are provided in the image acquisition device.

FIG. 4 a conceptual diagram of the reflection unit and the refraction unit 600 which are provided in the image acquisition device. FIG. 4 is referred together with FIG. 1.

The refraction unit 600 may refract the incident light as one surface 601 of the refraction unit is pressed and change a direction of the emitted light. The refraction unit 600 may emit the light after bending the direction of the light by refracting the incident light based on a difference between the thicknesses of surface areas.

A main example of the refraction unit 600 may be a fluid lens. Inner materials of the fluid lens are arranged along areas as one surface 601 is pressed unsymmetrically so that it may have different thicknesses.

The travelling direction of the light incident in a perpendicular direction with respect to the other surface 602 is bent by the different thicknesses of the refraction unit 600. When a left area of the refraction unit 600 becomes thick by the tilting of the pressing unit 610 as shown in FIG. 4(b) in a state where the pressing unit 600 is not pressing the refraction unit 600, the incident light is bent to the left side. In case of the reverse tilting as shown in FIG. 4(c), the incident light is bent to the right. The direction or degree of the refraction may be variable according to a refractive index of a medium.

The pressing unit 610 forms a pressing surface and the pressing surface is configured to deform the shape of the lens provided in the refraction unit 600 and keep the deformed shape.

Referring to FIG. 1 again, a first drive unit and a second drive unit are provided in the image acquisition device 100 and configured to perform movement for the x-axis image stabilization and movement for the y-axis image stabilization of the image acquisition device 100.

As one example, the first drive unit is configured to move for the x-axis image stabilization and the second drive unit is configured to move for the y-axis image stabilization.

Especially, the first drive unit may provide a driving force for deforming the refraction unit 600 by tilting the pressing unit as shown in the embodiment of FIG. 4. More specifically, the first drive unit mat tilt the pressing unit 610 with respect to the first direction axis to stabilize the x-axis shaking of the image of the image acquisition device 100.

The second drive unit may be realized as the tilting of the pressing unit 610 like the embodiment of FIG. 4. Alternatively, the second drive unit may be realized as the rotation of the reflection unit 300 as described referring to FIG. 2(b) and FIG. 3(b).

Hereinafter, the first drive unit will be realized as the tilting of the pressing unit 610 unless specifically noted and the second drive unit will be realized as the rotation of the reflection unit 300 to perform the image stabilization.

Figure 5:
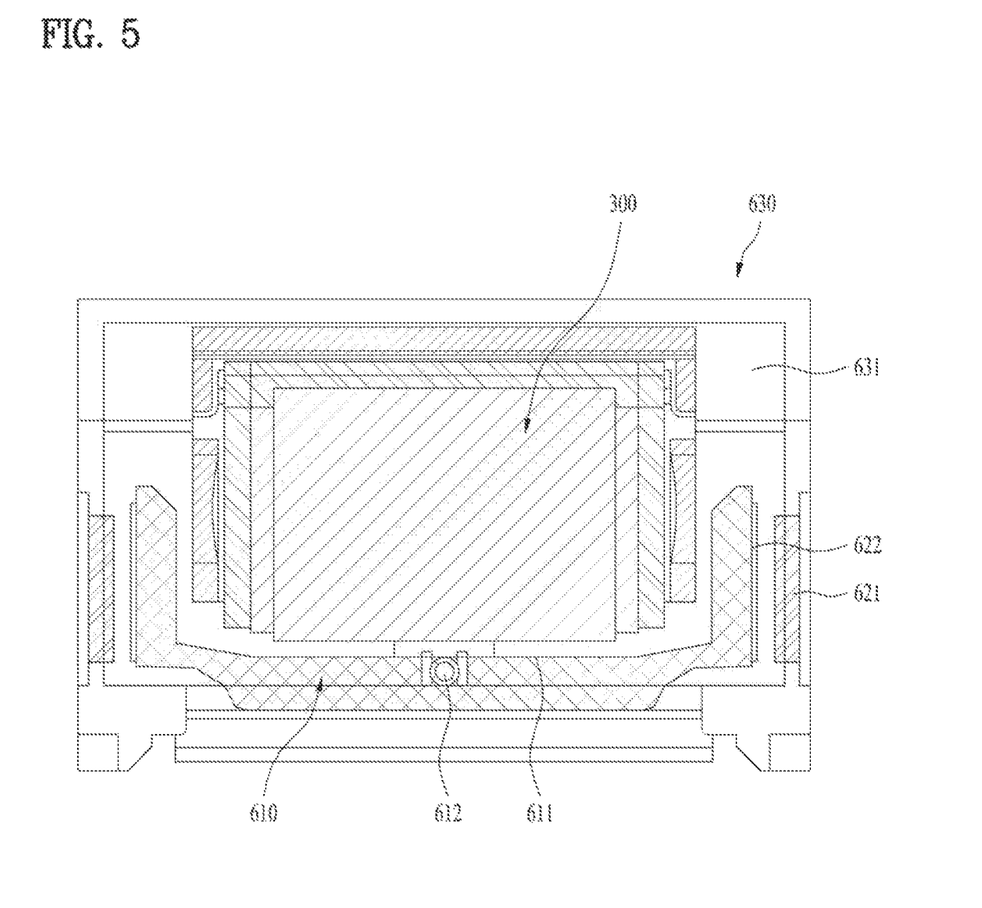
FIG. 5 is a diagram illustrating a pressing unit and a first drive unit in accordance with one embodiment.

FIG. 5 is a diagram illustrating a pressing unit 610 and a first drive unit in accordance with one embodiment. For easy description, FIGS. 1 and 4 will be referred together.

The pressing unit 610 may perform a tilting rotation with respect to a fixing end 630. In this instance, the fixing end 630 means a configuration which performs the same movement with the hand-shaking or vibration of the image acquisition device. Especially, the fixing end 630 may include a housing 631 for loading components such as the reflection unit 300, the refraction unit 600, the pressing unit 610 and the like. The housing 631 may also move together with the hand-shaking or vibration of the image acquisition device as a part of the fixing end 630.

The pressing unit 610 or the reflection unit 300 may form a moving end which is configured to relatively move with respect to the fixing end 630.

For the rotation of the pressing unit 610, the pressing unit 610 may include a first hinge 612 configured to provide a rotation axis. The first hinge 631 may be hingedly coupled to a hinge hole of the housing 631.

When the first drive unit is realized as a drive system (VCM) configured of magnet and a coil, one of the magnet and coil is fixed to the fixing end 630 and the other one is fixed to the pressing unit 610 to perform the tilting movement by using a mutual electromagnetic force. Each of the first and second drive units may include a power supply unit for applying an electric current to the coil.

Figure 6:
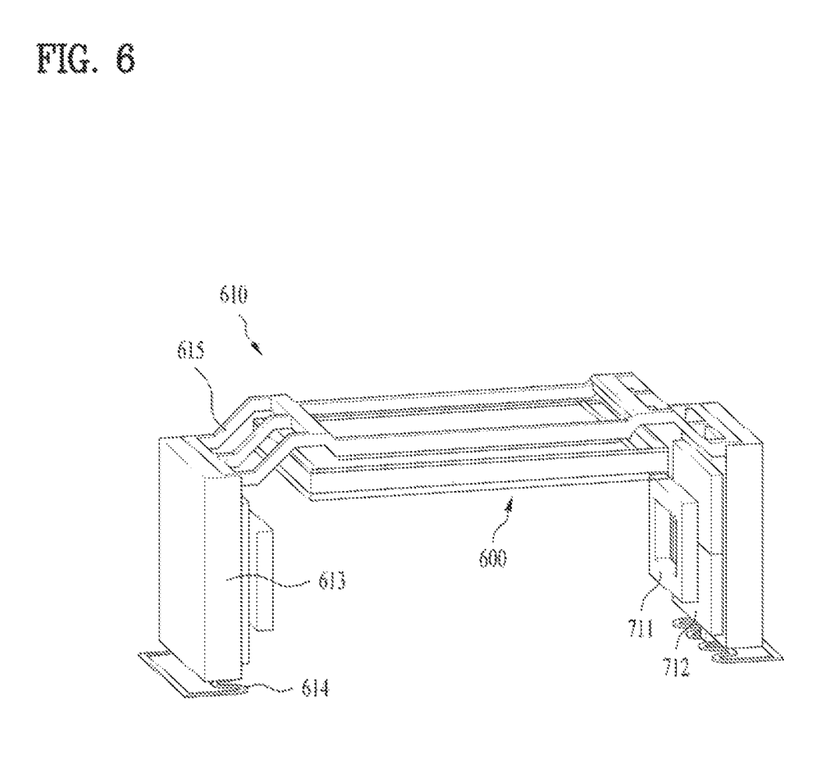
FIG. 6 is a diagram illustrating a pressing unit and a first drive unit in accordance with another embodiment.

FIG. 6 illustrates another embodiment of the pressing unit 610 and the first drive unit.

Different from the embodiment of FIG. 5, the tilting of the pressing unit 610 may be realized by the perpendicular movement of the two ends of the pressing unit 610. In this instance, the vertical movement means the perpendicularity with respect to the other surface of the refraction unit.

Both ends of the pressing unit 610 may be coupled to a slider 613 for the perpendicular movement. The slider 613 may move in a perpendicular direction with respect to the other surface of the refraction unit 600 by the mutual electromagnetic force between the coil 711 and the magnet 712. The perpendicular movement of the slider 613 may tilt the pressing unit 610 to make the thicknesses of the refraction unit 600 be in asymmetry.

As one example, when a left slider 613 moves downwards vertically and a right slider 613 moves upwards vertically, a right area of the refraction unit 600 becomes thick by the tilting of the pressing unit 610 and a left area becomes thinner only to adjust the emission direction of the light. A driver which will be described later may be configured to drive the first drive unit to move the left slider 613 and the right slider 613 in the reverse directions. At this time, the first drive unit may include the coil and the magnet as mentioned above.

The sliders 613 may be secured to plate springs 614, respectively, to be provided with a force of restitution once moved in the reverse directions. When the electromagnetic force becomes extinct after the image stabilization, the slider 613 is restituted by the plate spring 614. After the tilting of the pressing unit 610, the left and right areas of the refraction unit 600 becomes in symmetry and the light penetrating the emission surface travels vertically.

The magnet 712 is fixedly arranged in the slider 613 provided as the moving end and the coil 711 is arranged in the fixing end so that the sliders 613 may be moved by the mutual electromagnetic force.

In this instance, the magnet 712 may be provided and arranged to form a line of a magnetic force which passes through the coil 711. The power supply unit may apply an electric current to the coil 711.

As occasion occurs, the arrangements of the coil 711 and the magnet 712 may be reversed.

The pressing unit 610 may be provided with a kind of a twisting force by the movement of the slider 613. To prevent the breakage caused by the stress applied to the pressing unit 610, a connection bridge 615 may be provided to connect the pressing unit 610 with the slider 613.

Figure 7:
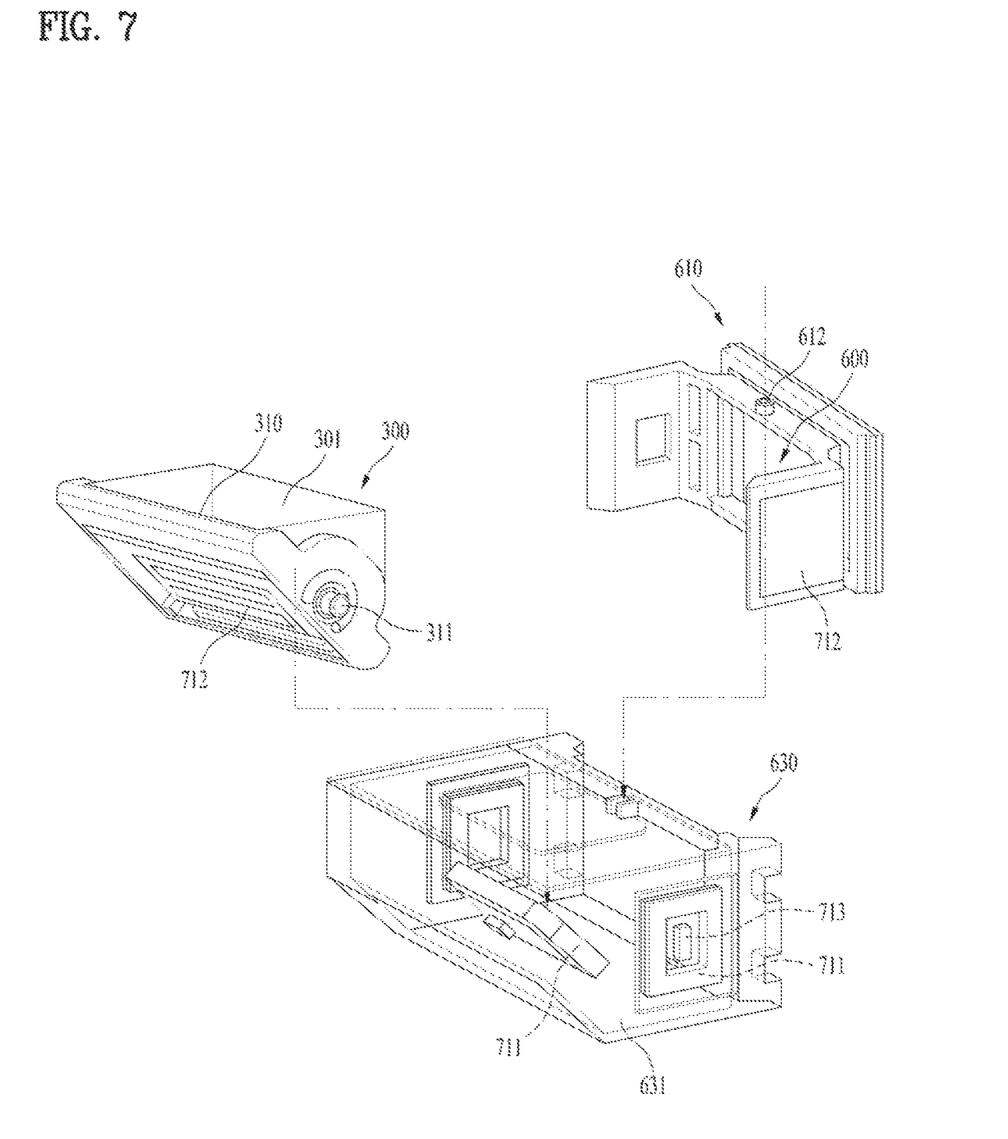
FIG. 7 is an exploded perspective diagram partially illustrating the image acquisition device.

FIG. 7 is an exploded perspective diagram partially illustrating the image acquisition device.

The reflection unit 300 may stabilize the hand-shaking or vibration of the image with respect to the y-axis of the image sensor by using the second drive unit. As one example, the reflection unit 300 is able to stabilize the y-axis vibration by the rotation. The y-axis direction image stabilization performed by using the rotation may mean the tilting of the reflection unit 300 with respect to a horizontal axis in a third direction which is perpendicular to the first and second directions mentioned above.

Both sides of the reflection unit 300 may be hingedly coupled to the fixing end 630 to rotate. The reflection unit 300 may include a reflection lens 301 configured to directly perform the reflection of the light; and a reflection unit bracket 310 provided to couple the reflection lens 301 to the fixing end 630. Second hinges 311 for the hinge-coupling to the fixing end 630 may be provided in both sides of the reflection unit bracket 310, respectively.

The magnet 712 may be provided in the reflection unit 300 and the coil 711 may be provided in the fixing end 630, so that the reflection unit 300 may be rotated by the mutual electromagnetic force between the coil 711 and the magnet 12.

As mentioned above, the rotational direction of the reflection unit 300 and the tilting direction of the refraction unit facilitated by the pressing unit 610 may be complementary so as to correct the hand-shaking or vibration in all directions of the image acquisition device.

The first hinge 612 of the pressing unit mentioned above may be rotatably coupled to the fixing end 630 to guide the rotation of the pressing unit 610.

A location sensor may be configured to recognize a degree of the rotation of the reflection unit 300 or a degree of the tilting of the pressing unit 610. As one example, a hall sensor 713 may be provided as the location sensor.

The location sensor of the reflection unit 300 may be provided at a first point of the fixing end 630, corresponding to the location of the magnet of the reflection unit 300. The location sensor of the pressing unit 610 may be provided at a second point of the fixing end 630, corresponding to the location of the magnet provided in the pressing unit 610.

Figure 8:
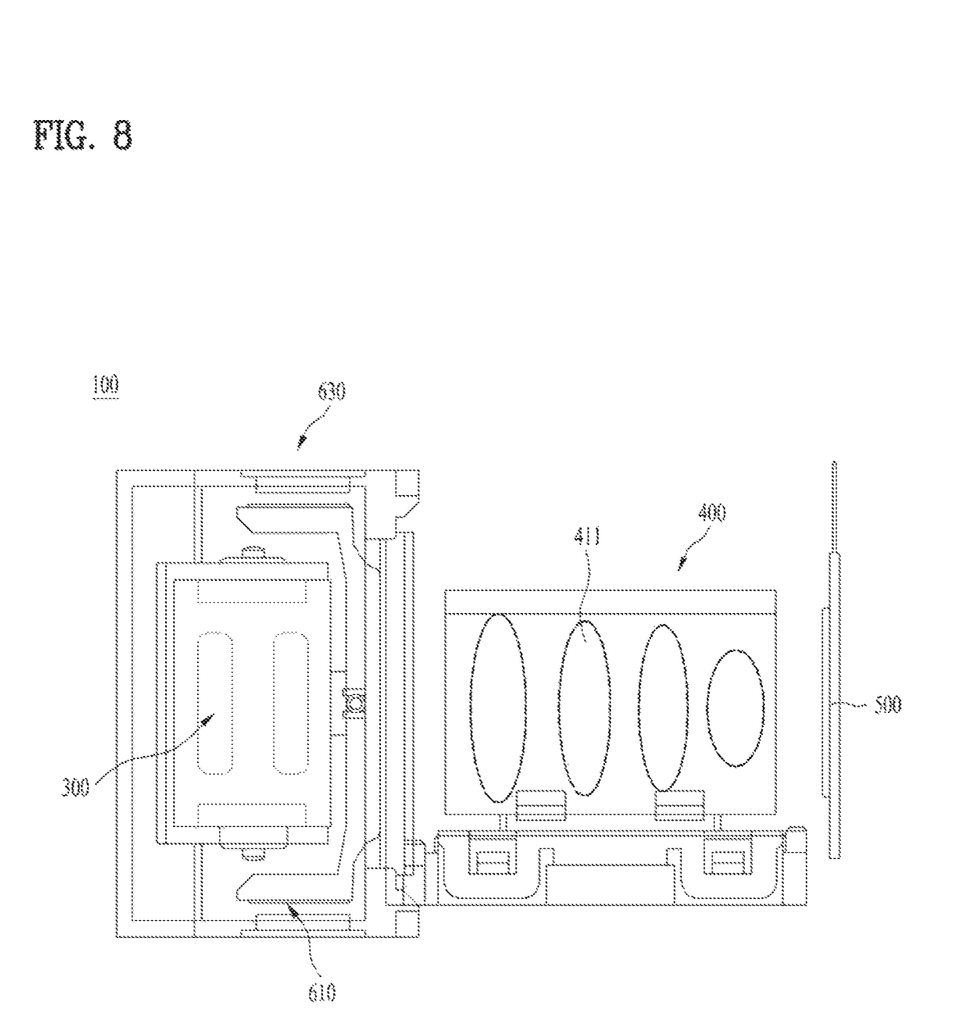
FIG. 8 is a top view of the image acquisition device.

FIG. 8 is a top view of the image acquisition device 100.

As mentioned above, the reflection unit 300 and the pressing unit 610 may be involved in the image stabilization of the image acquisition device 100 by the rotation or the tilting.

Meanwhile, an auto-focusing function of the image acquisition device 100 may be adjusted or controlled by the movement of the lens unit 400. The lens unit 400 may move in a direction which is parallel to the direction of the optical passage so as to implement the auto-focusing function. The lens unit 400 may include one or more lenses 411; and a main scope tube 401 for loading the one or more lenses 411.

The image acquisition device 100 in accordance with the present embodiment has a structural area for the image stabilization and a structural area for the auto-focusing independently. Accordingly, each of the functions may be modularized and a design freedom can be enhanced, which is distinguished from the embodiment of FIG. 2.

Figure 9:
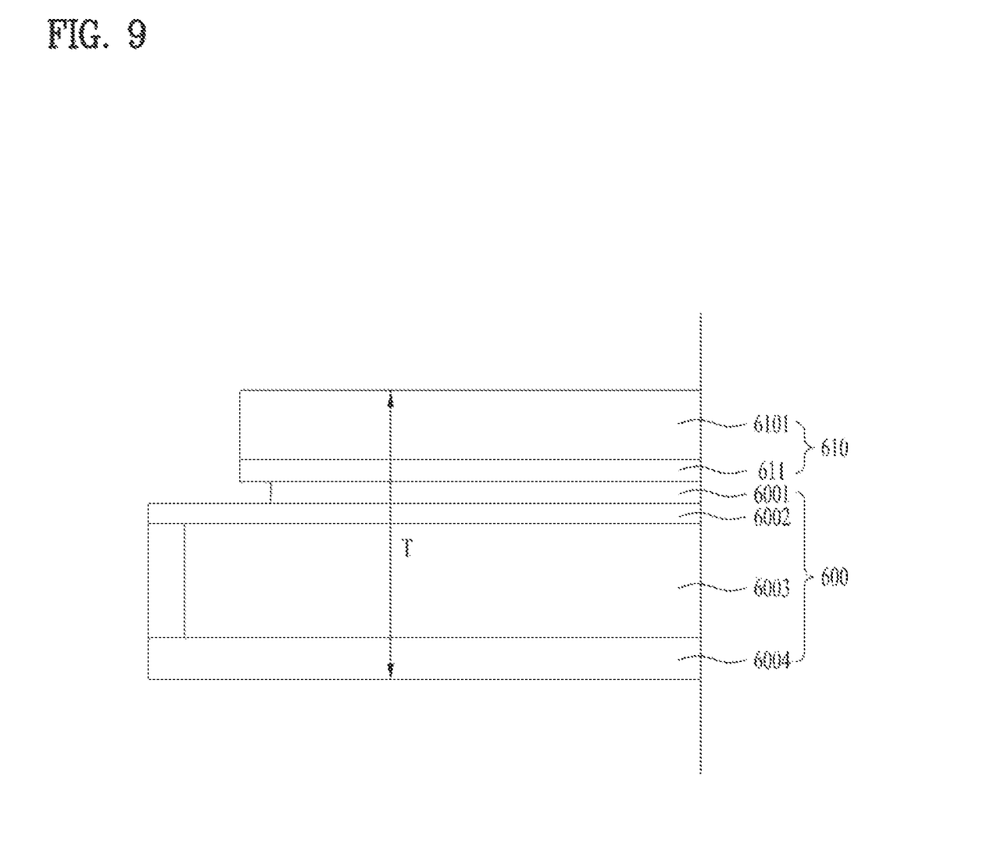
FIG. 9 is a sectional diagram schematically illustrating a pressing unit and a refraction unit.

FIG. 9 is a sectional diagram schematically illustrating the pressing unit 610 and the refraction unit 600.

As mentioned above, the pressing unit 610 may differentiate the thicknesses of areas by pressing the pressing unit 600 so as to emit the light after changing the direction of the incident light.

In the embodiment of FIG. 9, the refraction unit 600 may be a fluid lens. The pressing unit 610 includes a shaper 6101 configured to directly receive the tilting force.

The refraction unit 600 may include a flat plate 6001 which directly contacts with the pressing surface 611; a fluid 6003; a membrane 6002 for trapping the fluid 6003 in both sides; and a lower plate 6004.

When the flat plate 6001 is tilted by the pressing unit 610, one area of the membrane 6002 corresponding to the flat plate 6001 is deformed together with the membrane 6002.

The arrangement of the fluid 6003 may be differentiated as one or more areas of the membrane 6002 are pressed. A top area of a bottom area of the fluid 6003 may be trapped by the lower plate 6004 and a lateral area of the fluid 6003 may be trapped by a frame-shaped lateral wall. The lateral wall may include metal.

The refraction unit 600 of the pressing unit 610 is required to have a sufficient structural reliability and easily deformed by even a much less force. To satisfy such requirements, the thicknesses (T) of the pressing unit 610 and the refraction unit 600 may be approximately 1.3 mm.

Figure 10:
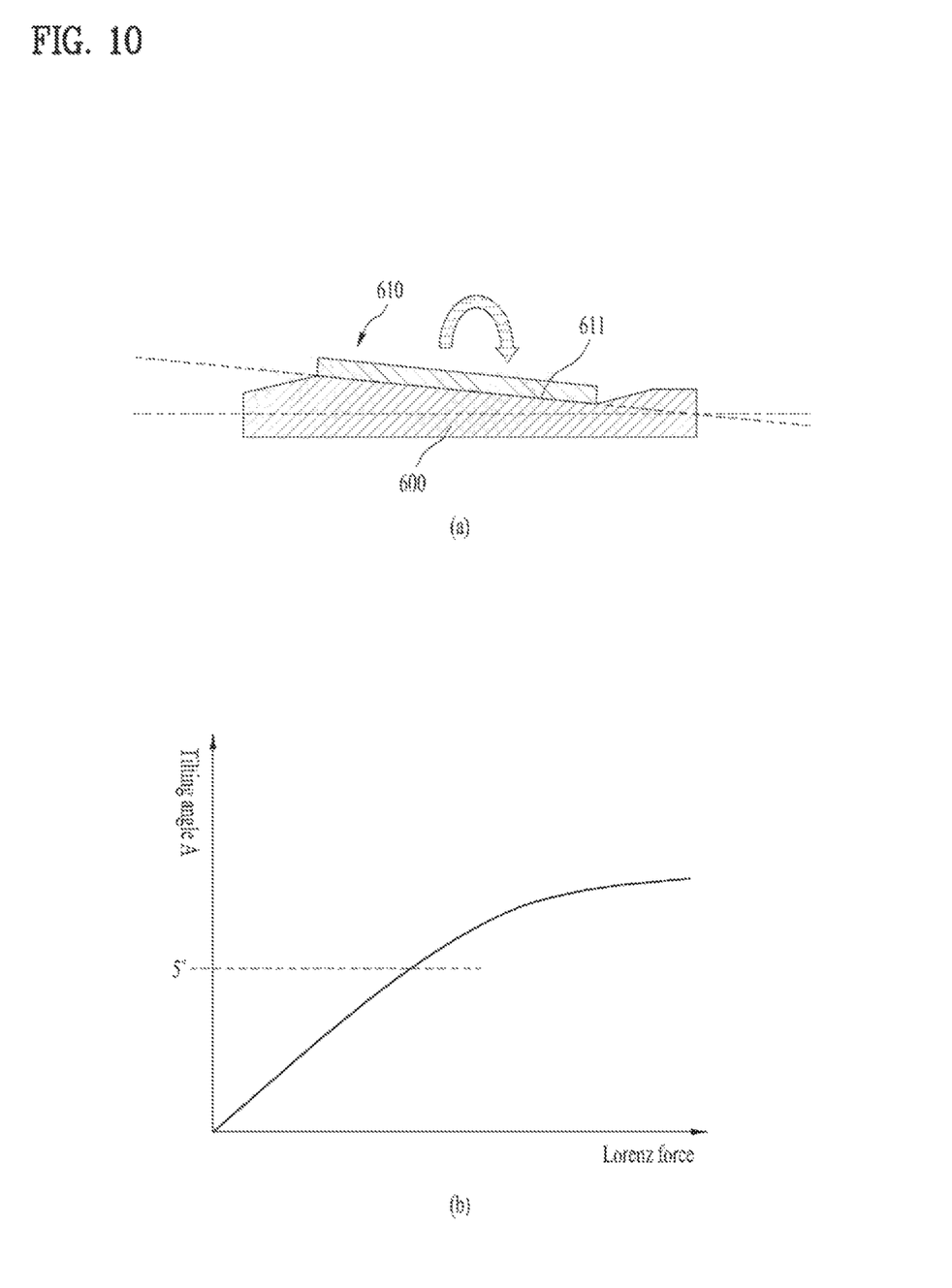
FIG. 10 is a graph showing a relation between Lorentz Force and a tilting angle of the pressing unit.

FIG. 10 is a graph showing a relation between Lorentz Force and a tilting angle of the pressing unit 610.

In case the refraction unit 600 is the fluid lens as mentioned in the embodiment of FIG. 9, the thicknesses of the areas of the refraction unit 600 may be realized in asymmetry according to a tilting degree of the pressing surface 611 of the pressing unit 610 as shown in FIG. 10(*a*). When the tilting of the pressing unit 610 is realized by the mutual Lorentz Force between the coil and the magnet, Lorentz Force and a tilting angle of the pressing unit 610 are shown in FIG. 10(*b*). The tilting angle of the pressing unit 610 is proportional to Lorentz Force in a specific range. However, the tilting angle is changed nonlinearly out of the specific range so that it may be difficult to control the tilting angle as a desired value. Such the tilting angle may be 5°. Accordingly, it is preferred that the pressing unit 610 and the refraction unit 500 is designed to realize the tilting angle as 5° or less.

Figure 11:
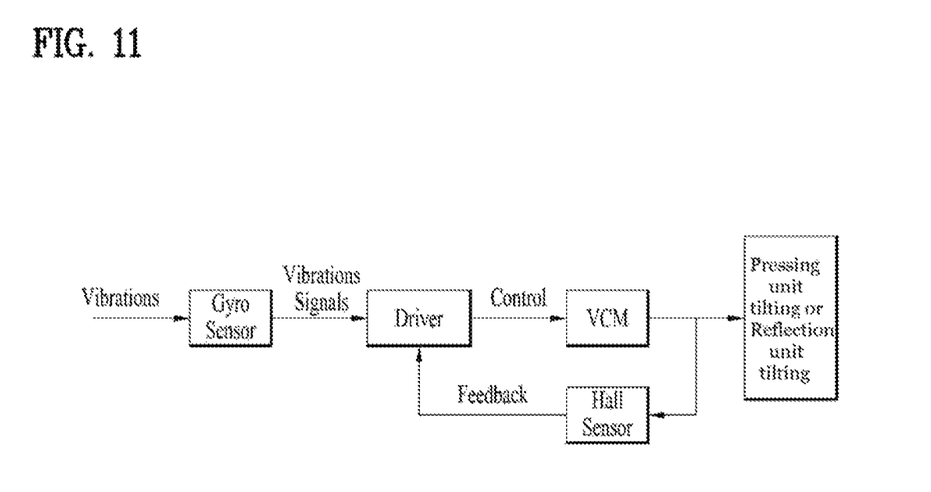
FIG. 11 is a flow chart of the image acquisition device.

FIG. 11 is a flow chart of the image acquisition device.

A driving algorithm of the image acquisition device in accordance with the present disclosure will be as follows.

A gyro sensor may sense the vibration of the image acquisition device. A driver may control the first drive unit configured of the magnet and coil drive system (VCM) or the second drive unit based on the vibration signal sensed by the gyro sensor. Accordingly, the magnet and the coil generate the mutual Lorentz Force and the tilting of the pressing unit or the reflection unit is realized. A hall sensor senses a tilting degree of the pressing unit or the reflection unit and sends a feedback to the driver. A tilting degree of the pressing unit or the reflection unit which is sensed by the hall sensor becomes a variable which is used by the driver in controlling the magnet and coil drive system (VCM).

Figure 12:
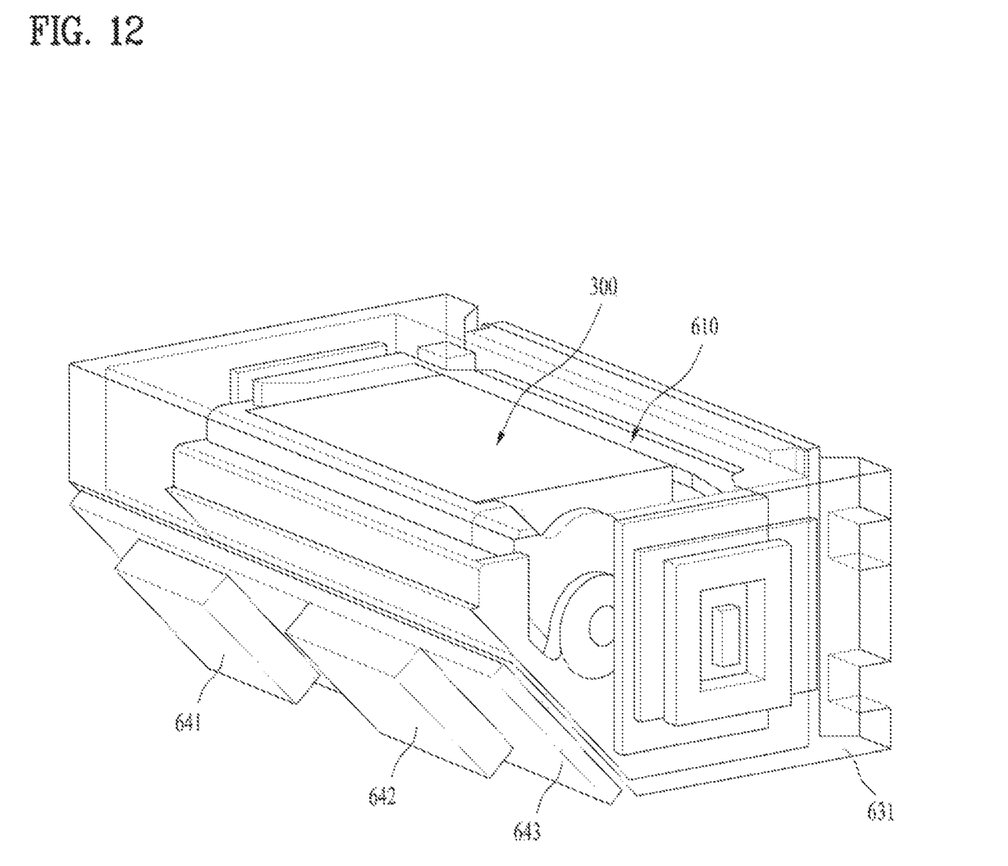
FIG. 12 is a perspective diagram partially illustrating the image acquisition device.

FIG. 12 is a perspective diagram partially illustrating the image acquisition device.

As mentioned when describing FIG. 11, the gyro sensor 641 and the driver 642 may control the tilting of the pressing unit 610 or the reflection unit 300. The gyro sensor 641 and the driver 642 may be provided in a substrate 643. The substrate 643 in which the gyro sensor 641 and the driver 642 are loaded may be provided in parallel with the reflection surface of the reflection unit 300 so as to effectively use the space. Especially, the substrate 643 may be fixedly coupled to an outer surface of the housing 631 in which the reflection unit 300 and the pressing unit 610 are loaded.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image acquisition device comprising:
    a reflector configured to reflect a light incident in a first direction toward a second direction which is perpendicular to the first direction;
    a lens unit comprising one or more lenses provided behind the reflector on an optical passage, the lens unit configured to form the optical passage in the second direction;
    a refraction unit provided between the lens unit and the reflector and varying a refraction direction as one surface is pressed;
    a pressing unit forming a pressing surface which contacts with one surface of the refraction unit;
    a first motor configured to tilt the pressing surface with respect to a first direction vertical axis; and
    a driver operably coupled to the first motor and configured to drive the first motor in response to vibration.

2. The image acquisition device of claim 1, wherein the first drive motor comprises:
    a coil;
    a magnet configured to form a line of a magnetic force which passes through the coil; and
    a power supply unit configured to apply an electric current to the coil.

3. The image acquisition device of claim 1, further comprising:
    a housing in which the reflector is loaded;
    a hinge hole provided in the housing; and
    a first hinge hingedly coupled to the hinge hole and configured to guide the tilting of the pressing unit.

4. The image acquisition device of claim 1, further comprising:
    sliders respectively provided at each side of the refraction unit in a perpendicular direction with respect to another surface of the refraction unit;
    a connection bridge provided to respectively connect one side of each slider to both sides of the pressing unit; and
    a plate spring configured to connect another side of each slider to a fixing end.

5. The image acquisition device of claim 4, wherein the first motor comprises:
    a coil fixedly coupled to the fixing end; and
    a magnet fixedly coupled to the slider and configured to generate a mutual electromagnetic force together with coil,
    wherein the driver drives the first motor to move the sliders in opposite directions.

6. The image acquisition device of claim 1, further comprising:
    a second motor configured to tilt the reflector with respect to a horizontal axis in a third direction which is perpendicular to the first direction and the second direction.

7. The image acquisition device of claim 6, further comprising:
    a housing in which the reflector is loaded,
    a reflector bracket comprising a second hinge with respect to the third direction horizontal axis, and
    the second motor comprising a coil provided in the housing;
    a magnet configured to form a line of an electromagnetic force which passes through the coil; and
    a power supply unit configured to apply an electric current to the coil.

8. The image acquisition device of claim 1, further comprising:
    a gyro sensor configured to sense vibration of the lens unit.

9. The image acquisition device of claim 8, further comprising:

a substrate on which the driver and the gyro sensor are loaded; and a housing in which the reflector is loaded, wherein the substrate is provided at an outer surface of the housing in parallel with a reflection surface of the reflector.

10. The image acquisition device of claim 1, wherein the lens unit comprises;

one or more lenses; and a main scope tube in which the one or more lenses are loaded, wherein the image acquisition device further comprises:

an auto-focusing drive unit configured to move the lens unit in parallel with a direction of the optical passage.

11. The image acquisition device of claim 1, wherein a thicknesses of the refraction unit is 1.3 mm.

* * * * *